CIRCUIT FOR ADDING THE LUMINANCE AND COLOR DIFFERENCE SIGNALS IN A SIGNAL PROCESSING APPARATUS FOR A COLOR TELEVISION RECEIVER

Filed Oct. 31, 1966

2 Sheets-Sheet 1

Inventor
George W. Fyler
By Francis W. Crotty
Attorney

CIRCUIT FOR ADDING THE LUMINANCE AND COLOR DIFFERENCE SIGNALS IN A SIGNAL PROCESSING APPARATUS FOR A COLOR TELEVISION RECEIVER

Filed Oct. 31, 1966 2 Sheets-Sheet 2

Inventor
George W. Fyler
By Francis W. Crotty
Attorney

United States Patent Office 3,470,311
Patented Sept. 30, 1969

3,470,311

CIRCUIT FOR ADDING THE LUMINANCE AND COLOR DIFFERENCE SIGNALS IN A SIGNAL PROCESSING APPARATUS FOR A COLOR TELEVISION RECEIVER

George W. Fyler, Lombard, Ill., assignor to Zenith Radio Corporation, Chicago, Ill., a corporation of Delaware Filed Oct. 31, 1966, Ser. No. 590,793
Int. Cl. H04n 5/38, 5/44
U.S. Cl. 178—5.4 10 Claims

ABSTRACT OF THE DISCLOSURE

This specification discloses a color television receiver apparatus which combines the luminance and demodulated color-difference signals external to the display tube to provide to the tube control signals which are representative of only the primary color components. The luminance signal is applied across a first load resistor and the demodulated color difference signal is applied across another resistor A.C.-connected in series with the first resistor to produce the primary color signal.

Figure 1:
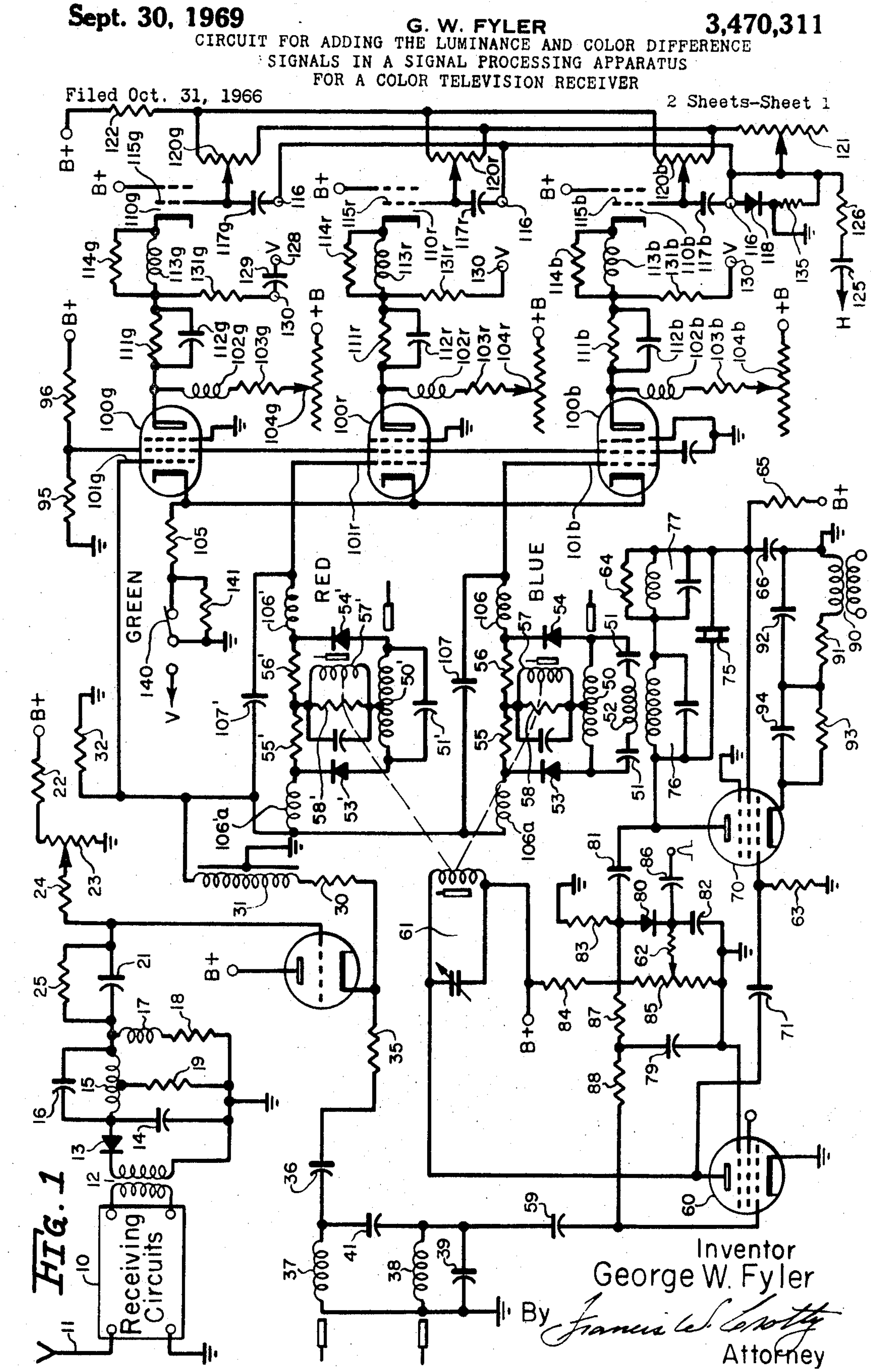

The present invention is directed to apparatus for processing luminance and chrominance signals in a color television receiver.

Current color telecasts, in accordance with the specifications prescribed by the Federal Communications Commission, feature a composite color television signal having two major components, a luminance signal representing brightness information of an image and a chroma signal conveying color information of that image. The composition of the luminance signal is similar to the video signal employed in monochrome transmission and permits the broadcast to exhibit compatibility for the simple reason that monochrome receivers may respond to the luminance component and reproduce an image of the broadcast in black and white. The chroma signal supplies the additional information that is necessary only in the reproduction of images in simulated natural color. It is in the form of a subcarrier signal that has been phase and amplitude modulated in accordance with indicia of hue and saturation. Obviously these principal signal components are available at the picture detector and require processing in order to produce the drive signals which control the image reproducing device.

One popular form of image reproducer is the three-gun shadow-mask tube and one type of signal processing apparatus operates on the output signal of the picture detector to deliver the luminance signal to the cathodes and to deliver color-difference signals to assigned ones of the grids in the three guns of the tube. These signals are matrixed within the picture tube to the end that each of the electron beams is controlled by one of three primary color signals. As an incident to this signal processing, it is necessary to demodulate the chroma signal and generally that is accomplished in two or more synchronous demodulators. By appropriate selection of the phase angle of the injected demodulation or reference signal and proper determination of detection gain, the desired color-difference signals are derived for application to the color tube. One form of demodulator that has been employed very successfully includes a beam deflection tube as a synchronous demodulator. It is, however, a high level detector which feeds three color-difference signals directly to the picture tube. Certain advantages flow from the use of low level demodulation such as that described herein.

Another form of demodulation system which functions at relatively low level features two synchronous detectors which derive a pair of color-difference signals that are applied to a matrix along with the luminance signal so that through their proper combination the third color-difference signal is developed. Again, these three color-difference signals and the luminance signal are applied to the picture tube for internal matrixing. This too performs satisfactorily but represents, in comparison with the arrangement presently to be described, a relatively costly system.

Still another approach to the processing apparatus, as illustrated for example in U.S. Patent 2,960,562 issued on Nov. 15, 1960 in the name of Albert Macovski, features a simplified structure in that the composite color television signal from the picture detector is applied to synchronous demodulators controlled to obtain color-difference signals by demodulating the chroma signal. Since the color-difference signal detected in each demodulator is present along with the luminance signal, their combination produces an output from each demodulator of a primary color signal for direct application to the color picture tube. This structure is subject to certain limitations that are avoided in the arrangement to be described. In the earlier structure the luminance and chroma signals traverse a common channel and it is therefore impossible to introduce time delay which, as a practical matter, is generally necessary in a color receiver because of the difference in time delay inherent in circuits having unequal bandwidths. Additionally, the prior structure has a frequency response for the common luminance and chroma channel that exalts the chroma signal which may be undesirable since the channel couples directly to the signal grid of the picture tube and it is distinctly preferred to isolate the chroma signal from the signal grid of the picture tube.

Accordingly it is a principal object of the invention to provide a novel signal processing apparatus for a color television receiver.

It is another object of the invention to provide such an apparatus which features low level demodulation of the chroma signal.

It is another specific object of the invention to provide signal processing apparatus of the type under consideration characterized by simplification and cost reduction.

In accordance with the invention, a signal processing apparatus for a color television receiver comprises a video detector system for supplying a composite color television signal having a luminance signal representing brightness information of an image and further having a chroma signal including modulation components representing color information of that image. A first signal source, including a load impedance for deriving the luminance signal, has an input circuit coupled to the detection system. A second signal source for deriving the chroma signal substantially free of the luminance signal likewise has an input circuit coupled to the detection system but independent of the connection of the first-mentioned source to the detection system. The second source includes a demodulator having a load impedance for developing a color-difference signal from the chroma signal and the load impedances of both the first and second sources are connected in series to combine the luminance and color-difference signals to develop a primary color signal.

While the source which delivers the luminance signal may be combined with three chroma sources, similar to one another but having individual phase assignments of the injected reference signal to derive three color-difference signals, it is preferred that there be only two such sources for supplying color-difference signals. In such an embodiment, these sources, supplying the luminance and two color-difference signals, form separate series connections with the control electrodes of three valves comprising an active matrix of the type described and claimed in Patent 3,180,928 issued on Apr. 27, 1965 in the name of John L. Rennick and assigned to the same assignee as the present invention. A common emitter impedance of the matrix, in conjunction with the several signals applied thereto, develops the third primary color signal. Amplified versions of all three primary color signals, having the proper levels with relation to one another, are obtained at the individual load impedances of the valves in the matrix for application to the input electrodes of the color picture tube.

Other features of the invention concern a novel contrast control which accomplishes simultaneous and proportionally weighted adjustments of the luminance and chroma signals.

Further novelty is associated with the circuitry of the three-gun color tube. For example, an arc suppressor is coupled with the signal grids of the three guns to protect the cathodes from the deleterious effects of arcing that may occasionally occur in the electrode systems. The signal grid arrangement of the three guns also provides individual bias adjustments for each gun and a brightness control that is simultaneously effective for all three guns.

Figure 2A:
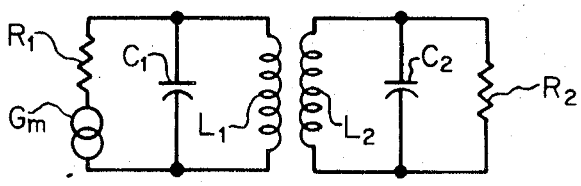
Figure 2B:
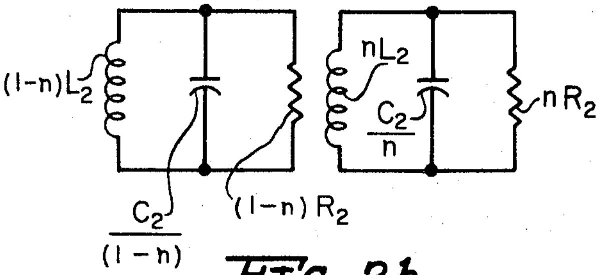
Figure 2C:
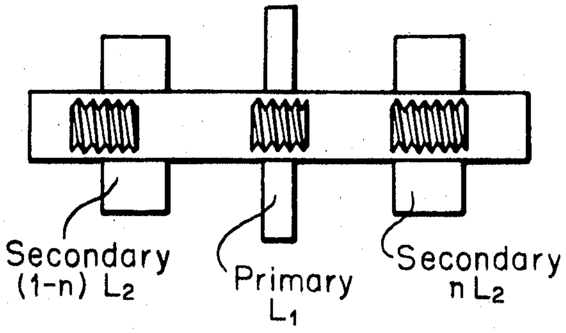
Figure 3:
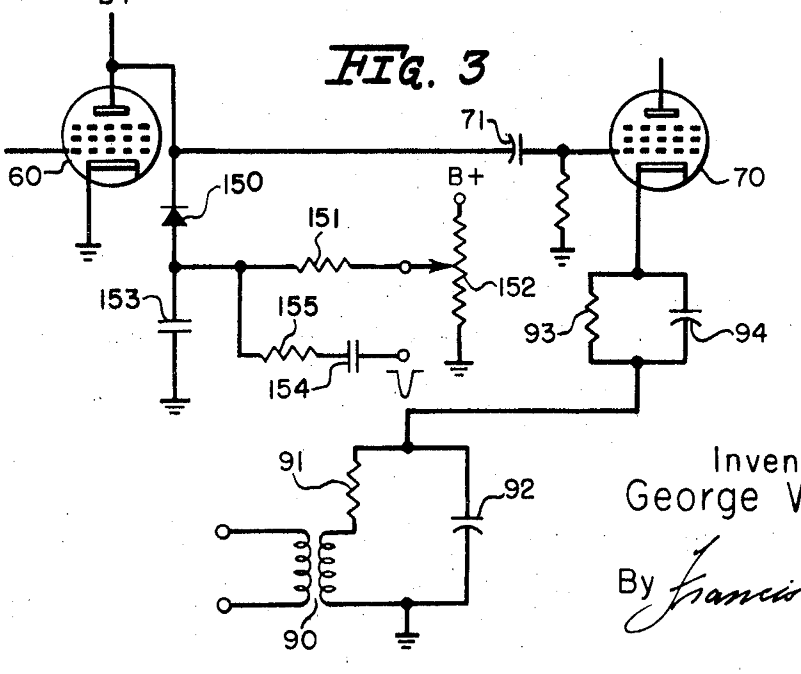

The features of the present invention which are believed to be novel are set forth with particularity in the appended claims. The invention, together with further objects and advantages thereof, may best be understood by reference to the following description taken in connection with the accompanying drawing, and in which: FIGURE 1 represents in schematic diagram form a color television receiver having a signal processing apparatus embodying the invention; FIGURES 2*a* and 2*b* are circuit diagrams used in explaining the development of certain coupled circuits of the receiver; FIGURE 2*c* represents a tuning adjustment for those circuits; while FIGURE 3 is a modification of a portion of that receiver.

In FIGURE 1, the block 10 designated "receiving circuits" is intended to represent stages required in such a receiver but which, of themselves, constitute no part of the present invention. These stages would include, for example, VHF and UHF tuners which are connected to an antenna system 11, for selecting any of the VHF and UHF television channels and a unicontrolled heterodyning oscillator which collectively supply signals to a first detector to develop a suitable intermediate frequency signal. The first detector is followed by stages of intermediate frequency amplification shown in the drawing as terminating in the primary winding of an interstage transformer 12 through which the IF signal is supplied to a video detection system presently to be described.

The receiving circuits not otherwise particularized also include a sound system which derives an intercarrier sound component. After suitable detection and amplification the recovered audio energizes a loud speaker. Additionally there is a synchronizing signal separator for controlling line and field sweep systems which energize the usual deflection yoke of the picture tube to cause the three beams thereof to trace a recurring pattern of parallel lines in synchronism with a similar scanning process conducted at the transmitter in generating the broadcast signal. Of course, it is essential where a three gun shadow mask tube is employed to assure convergence of the three electron beams at all points in the scanning raster and this is accomplished by both dynamic and static convergence assemblies. Finally, it is common practice to include auxiliary control systems such as automatic gain control which maintains an approximately constant signal level to the video detection system and automatic frequency control for the heterodyning oscillator. As stated earlier, these various components of the receiver are no part of the claimed invention and may be of well known construction and operation. They have not been illustrated in the drawing in order not to obscure the signal processing apparatus now to be described.

This apparatus comprises a video detection system for supplying a complete color television signal having a luminance signal and further having a chroma signal with modulation components representing color information. For the most part, this picture detector is of conventional construction including the interstage transformer 12, a diode 13, a bypass capacitor 14 and a load circuit. One terminal of the diode connects through an inductor 15 bridged by a capacitor 16, an inductor 17 and a resistor 18 to ground. A tap of inductor 15 is likewise connected to ground through a resistor 19. The output of the picture detector is delivered through a cathode follower stage provided by a triode 20 having a control electrode connected through a capacitor 21 to the high potential output terminal of the detector load circuit. There is a voltage dividing network including a bias adjusting potentiometer for the cathode follower which serves as a contrast control. More specifically, this arrangement is provided by a resistor 22 connected between a potential source B+ and ground through a potentiometer 23. The adjustable element of the potentiometer returns to ground through high impedance resistors 24 and 25, the latter bridging coupling capacitor 21, and through the low impedance picture detector circuit. As stated, the detection system is a source of a composite color television signal.

The cathode circuit of triode 20 is branched and one branch includes a resistor 30, a properly terminated delay line 31 and a resistor 32 connected to ground. For convenience of terminology and in particular to aid in understanding the various signal paths of the color processing apparatus, this branch of the cathode-follower circuit is denominated a first signal source having an input circuit coupled to the detection system and having a load impedance 32 for deriving therefrom the luminance or Y signal of the composite color television signal. In this arrangement, delay line 31 provides time delay with respect to the chroma signal sources presently to be described.

The second branch of the cathode circuit of triode 20 serves as the input of a second signal source for deriving the chroma signal portion of the composite color television signal separated from and therefore substantially free of the luminance signal. The input circuit of this signal source comprises a filter in the form of a double-tuned coupled circuit selective to the chroma signal and having a passband (approximately 3.58±0.5 mc.) sufficiently wide to accept only the significant modulation components of the chroma signal. The primary tuned circuit comprises an inductor 37 series tuned by a capacitor 36 and damped by a resistor 35. The secondary circuit comprises an inductor 38 shunt tuned by a capacitor 39 and the input capacitance of a tube 60. A capacitor 41 interposed between these tuned circuits determines the bandwidth. As indicated schematically, tuning slugs may be associated with the filter coils. This tuned input circuit is independent of the input circuit leading from cathode follower 20 to the source 32 of the Y signal.

The chroma signal requires demodulation in order to obtain at least two color control signals which in conjunction with the luminance signal provide both brightness and color information used in controlling the image reproducing device. Accordingly the chroma signal source under consideration includes a demodulator for each color control signal that is to be developed. As stated in the introduction, the processing apparatus may feature three such demodulators, one for each of three color control signals, or it may have only two such demodulators cooperating with a matrix to provide the third necessary color signal. It is this latter expedient that has been shown in the drawing.

One such demodulator, designated "blue" in the drawing, is in the form of an averaging synchronous diode detector having one tuned input comprising an inductor 50 across which are connected the series arrangement of a pair of capacitors 51, 51 and a coupling coil 52. This circuit is resonant to the frequency of a reference signal which in turn corresponds to the fundamental frequency of the subcarrier signal conveying the chroma information. A pair of diodes 53, 54 are coupled in like polarity to opposite terminals of the resonant input so that the reference signal is applied thereto in push-pull fashion. The opposite terminals of the diodes connect with series-arranged load resistors 55, 56 and their common junction is connected through another resonant circuit 57 to the midpoint of inductor 50. Circuit 57 is of the LC type shunted by a resistor 58 and is likewise resonant at the fundamental of the chroma signal and tuning of both these circuits is available by means of slugs as indicated. The load impedance 55, 56 of the blue demodulator across which the blue color-difference signal B–Y is developed is connected in series with load impedance 32 to combine the luminance and blue color-difference signals to develop a blue primary color signal.

Of course, for the blue demodulator to develop the B–Y color-difference signal, it must be provided with the chroma signal to be detected and a reference signal of appropriate phase for the demodulation process. The first of these signals is supplied through a chroma amplifier including a pentode tube 60 having input electrodes coupled by means of a capacitor 59 to the picture detector through the chroma band pass filter 37–41. Tube 60 preferably is of the variable $\mu$ type and operates with a grounded cathode and an anode tuned by a circuit 61 which is resonant at the fundamental of the chroma subcarrier frequency. Anode potential is applied to this tube from a source +B in series with resonant circuit 61. The amplified chroma signal is delivered to the B–Y demodulator perforce of inductive coupling in a band pass coupled circuit comprising output circuit 61 of the chroma amplifier and the tuned push-push injection circuit 57 of the demodulator, this coupling being indicated by broken construction lines.

The other signal required for the demodulator, the reference signal, must be frequency synchronized as well as phase locked at a particular phase angle to the suppressed chroma carrier signal and this is accomplished by utilizing the color burst component of the composite color television signal. As is well understood, the color burst is simply a few cycles of the fundamental of the subcarrier signal employed for transmitting chroma information and it appears during line retrace intervals of the composite color television signal. It is separated from that signal by gating techniques and to that end the apparatus under consideration includes a gated burst amplifier comprising another pentode tube 70 having an input electrode coupled through a capacitor 71 to the anode of tube 60. The anode circuit of the gated amplifier is a high-Q circuit tuned to the chroma signal, that is to say, tuned to the color burst. Structurally, this circuit comprises a piezoelectric crystal 75 tuned by an LC resonant circuit 76. There is still another resonant circuit 77 connected between circuit 76 and the crystal and provided to suppress a spurious oscillation that has been experienced in the crystal ringing circuit. Circuit 77 resonates at the frequency of the spurious signal and critically damps the overall plate circuit of tube 70 at this unwanted frequency. It has been found that driving the crystal by the separated color burst causes the high-Q circuit to ring and develop a continuous signal that is frequency synchronized and phase locked at an adjustably fixed phase angle relative to the color burst and of sufficient constancy in amplitude and phase for direct injection into the balanced demodulators as a demodulation or reference signal. Injection is achieved by inductive coupling of resonant circuit 76 of the gated amplifier and inductor 52 of the blue demodulator.

Gating of amplifier 70 is achieved by applying a suitably shaped pulse of negative potential and appropriate duration to the cathode. The pulse may be derived from the line scanning system because it is well known that retrace pulses are unavoidably generated in the line scanning system. It is applied through a transformer 90 to an integrating network comprising resistor 91 and a capacitor 92 for shaping purposes. The pulse is applied to the cathode through a self biasing network provided by resistor 93 and a shunt capacitor 94. Tube 70 has the customary screen and anode voltage supplies which are shown but need not be described in detail.

It has proved desirable to include an automatic chroma control circuit for the purpose of maintaining approximately constant amplitude of the chroma and reference signals applied to the color demodulators in face of chroma modulation variations of the received program signal so as to maintain a uniform ratio of chroma versus luminance signal intensities. A gated delay-biased automatic chroma control circuit is employed in the apparatus under consideration. It comprises a diode 80 coupled by means of a capacitor 81 to the load circuit of the gated amplifier. The cathode of diode 80 is connected to ground through a capacitor 82 and its anode is similarly grounded through a load resistor 83. A voltage divider network comprising a source B+, a resistor 84 and a potentiometer 85 applies a positive delay bias voltage of adjustable value through a resistor 62 to the cathode of ACC diode 80. The negative control potential developed on resistor 83 in the ACC circuit by rectification of the ringing signal in the anode circuit of gated amplifier 70 varies in amplitude with variations in the color burst component of the received color signal. The control potential developed on resistor 83 is applied through a low pass filter comprising a resistor 87 and a capacitor 79, thence through decoupling resistor 88 to the input electrode of chroma amplifier 60 to accomplish the desired ACC control. It is desirable to gate off the ACC diode 80 during line retrace so that it only responds to the signal from the ringing circuit 75. For this purpose a gating pulse of positive polarity, also derived from the line-scan system, is applied to the cathode of the cathode of the diode through a capacitor 86.

The circuitry of the crystal supplying the reference signal and its relation to chroma amplifier 60 is specifically claimed in a concurrently filed application of George Fyler and Frank Kot, assigned to the assignee of this invention.

As thus far described, it is apparent that the blue demodulator is not only in series with Y signal source 32, but also floats with respect to that source. Moreover, the circuit arrangement, featuring these two signal sources coupled independently to the picture detector, facilitates time delay equalization. This is accomplished, for the case illustrated, by delay line 31 in the input connection to signal source 32.

As previously stated, the apparatus of FIGURE 1 contemplates deriving two color control signals and matrixing them to develop the necessary third color control signal. Accordingly, there is a third signal source identified in the drawing as the "red" demodulator. It is generally the same as the blue demodulator and similar components thereof are designated by the same reference characters primed, although the voltage levels in the two demodulators are frequently different. It will be observed that the load impedance 55′, 56′ of the red demodulator is likewise in series with the Y signal load impedance 32. The broken construction line extending from resonant circuit 61 of chroma amplifier 60 to resonant circuit 57′ indicates inductive coupling by means of which the amplified chroma signal is applied in push-push relation to the diodes of the red demodulator. There is additional inductive coupling between inductances 50, 50′ of the tuned circuits of the blue and red demodulators used for injection. By virtue of this coupling the reference signal developed in the anode circuit of burst amplifier 70 is also delivered to the red demodulator and since the coupling is between two similarly tuned circuits the phase of the reference signal of the blue demodulator is approximately in quadrature with that of the red demodulator.

This phase relation is selected because it is known that the R–Y color-difference signal may be obtained from the chroma signal by sampling with a phase angle substantially 90° phase displaced from the sampling of the blue demodulator.

The active matrix, utilized to develop the third primary color signal and for amplifying all three primary color signals, is basically that described and claimed in the afore-identified Rennick patent. It includes three amplifying valves **100*g*, 100*r* and 100*b* which preferably are of the variable $\mu$ type and have individual control electrodes 101*g*, 101*r* and 101*b* as well as individual output load impedances comprising inductors 102*g*, 102*r*, 102*b* resistors 103*g*, 103*r*, 103*b* and a potentiometer 104*g*, 104*r*, 104*b* through which operating potential is applied to each amplifier. These tubes have the usual screen grid circuits and for simplification the screen grid of chroma amplifier 70 may connect thereto. The matrix amplifiers share a common emitter impedance 105 where the expression "emitter impedance" is intended to be generic to a vacuum type of matrix which has a common cathode impedance as well as the transistorized form having a common emitter impedance. The control electrode 101*g* connects to luminance signal source 32 while the remaining control electrodes 101*r* and 101*b* connect to the load impedance of the red and blue demodulators, respectively. The last mentioned connections extend through the inductive components 106, 106' of L.C. filters having capacitive components 107, 107' and another similar pair of inductors 106*a* and 106*a'***. The filters are provided to isolate the control electrodes from signal frequencies corresponding to the chroma subcarrier. Obviously, series resonant trap circuits tuned to the subcarrier may be used for this purpose.

It is well established that having derived the blue and red primary color signals, they may be matrixed in suitable proportions with the luminance signal to develop the green primary color signal. A variety of methods are available for weighting the red and blue primary signals required for matrixing, a particular one of which will be described in relation to the circuit diagrams of FIGURES 2*a* and 2*b*.

The problem is to provide different voltage levels of the chroma signal in the blue and red demodulators while preserving constant bandwidth and at the same time having as high a signal level in the tuned output of the chroma amplifier as possible since on output signal from this amplifier provides energy for the crystal ringing circuit. In developing a solution to the coupling problem, initial consideration will be given to the single pair of coupled circuits of FIGURE 2*a* in which the circuit with the subscripts 1 is the primary while the circuit with subscripts 2 is the secondary. The signal source is a constant current generator with an internal impedance R1 of infinite value and a gain related to the transconductance Gm of tube 60. As related to FIGURE 1, tuned circuit L1, C1 corresponds with the tuned anode circuit of chroma amplifier 60. The secondary circuit represented by inductor $L_2$, capacitor $C_2$ and resistor $R_2$ is a symbolic representation of the tuned chroma input 54 of one of the demodulators. The following expressions are applicable to these coupled circuits:

$$R^2=\frac{1}{2\pi\sqrt{3}(BW)C_2} \quad (1)$$

$$k=\frac{\sqrt{2}(BW)}{f_0} \quad (2)$$

$$\text{Overall gain}=\frac{.113G_m}{(BW)\sqrt{C_1C_2}} \quad (3)$$

$$\text{Chroma amplifier plate gain}=\frac{\sqrt{3}G_m}{4\pi C_1(BW)} \quad (4)$$

In these expressions, (BW) represents bandwidth, $f_0$ is the center frequency of the passband and $k$ is the coefficient of coupling between coils $L_1$ and $L_2$. For the case in hand, the center frequency is approximately 3.58 megacycles and the bandwidth $\pm.5$ megacycles.

In Equation 1 it is observed that the bandwidth is inversely related to the $R_2$ $C_2$ product which means that a desired bandwidth can be realized so long as the RC product is as required. Moreover, given the bandwidth requirement and the value of either parameter $R_2$ or $C_2$ the other may be computed.

The overall gain, as shown in Equation 3, depends only upon bandwidth and the circuit capacitances for a tube of a given Gm. Reference to Equation 4 makes clear that chroma plate gain can be kept high to provide adequate intensity of the color burst signal by minimizing capacitor C1. The overall gain may be controlled, in particular reduced to any desired value, by suitably reducing $L_2$, $R_2$ and increasing $C_2$ to maintain the secondary tuning as well as the $R_2$ $C_2$ product and bandwidth. In short, there is adequate flexibility or degree of freedom to accomplish the necessary objectives of full gain in the primary tuned circuit for driving the crystal ringing circuit and a suitable low voltage level in the secondary for providing the proper amount of chroma needed for balance of reference and chroma signals in the demodulators.

Obviously, once the parameters of the coupled circuits have been ascertained it would be a simple matter to replace the single secondary with a pair of secondaries in which the inductive and resistive components are one-half the values of those shown in FIGURE 2*a* while the capacitors were each twice the value of that shown in this same figure. Were this substitution to be made, the secondary voltage of each of the pair of secondaries would be one-half that of the secondary in FIGURE 2*a* and constant bandwidth would be maintained.

For the case on hand, it is not only desirable to have a pair of secondaries with equal bandwidth properties but also with unequal secondary voltages. Such a pair of unlike secondaries may be derived from the secondary of FIGURE 2*a* by utilizing the parameters shown in FIGURE 2*b* in which the desired ratio of the secondary voltages is defined as:

$$n/1-n \quad (5)$$

where $n$ is an integer.

The physical arrangement of the inductances of the coupled circuits shown in FIGURE 2*c* permits a vernier adjustment of the ratio of chroma voltages in the secondaries. It will be observed that the secondaries as well as the primary are supported on a common coil form with the secondaries on either side of the primary. Each coil has a core that is threaded for adjustment coaxially of its coil. Obviously, the tuning core of either secondary should be provided with a central channel through which a tool may be inserted to rotate the core of the primary and advance it in one direction of the other so as to vary the mutual coupling in a compensating fashion and to vary the ratio of secondary voltages.

With the coupled circuits of the chroma amplifier anode circuit and two demodulators constructed in accordance with the foregoing, properly weighted primary signals are developed in the matrix and are amplified by the matrix amplifier tubes and used to control the three guns of the shadow mask type color image reproducing device. Such a cathode ray tube is known in the art and for purposes of simplification is shown in the drawing only as a diagrammatic representation of three electron guns, **110*g*, 110*r*, 110*b*. Each gun is cathode driven from its associated tube of the matrix through a coupling arrangement comprising a resistor 111*g*, 111*r*, 111*b* shunted by a capacitor 112*g*, 112*r*, 112*b* and connected in series with a high frequency compensation network of an inductor 113*g*, 113*r*, 113*b* and a shunting resistor 114*g*, 114*r*,**

114*b*. The first or signal control grid 115 of each gun is coupled through a capacitor 117*g*, 117*r*, 117*b* to a common terminal 116. The common terminal 116 is connected to ground through a diode 118 which completes an arc suppressing arrangement for protecting the cathode against arcing that may be experienced from time to time within any of the electron guns.

Additionally, each of the signal grids is connected to a network that permits independent adjustment of their operating bias and simultaneous adjustment of the biases for brightness control. The individual bias adjustments are provided by potentiometers 120*g*, 120*r*, 120*b* and the common brightness control is a potentiometer 121. This potentiometer is connected in an individual series circuit with each of the bias potentiometers 120 through a path extending from gound through diode 118, brightness control 121, the grid bias potentiometer 120, a dropping resistor 122 and a potential source.

It is desirable to block-out or suppress the electron beams of the picture tube during line and field retrace intervals. Retrace block-out, as such, is a known technique in accordance with which a suppressing pulse of proper polarity, waveform and duration is derived from the scanning system and is applied to the cathode or to the signal grid. As shown, a horizontal retrace pulse of negative polarity is applied through a capacitor 125 to a resistor 126 which returns to ground through a resistor 135. The junction of these resistors connects to the common terminal 116 and thus to the signal grids by way of capacitors 117*g*, 117*r*, 117*b*. Retrace block-out at the field rate is accomplished by a pulse of positive polarity obtained from the vertical scanning system and applied to a terminal 128. This terminal couples through a capacitor 129 to a terminal 130 that connects through resistors 131*g*, 131*r* and 131*b* to RC networks 111*g*/112*g*, 111*r*/112*r* and 111*b*/112*b* of relatively high impedance at the field rate. Most of the vertical blanking potential is developed across these networks for application to the cathodes of the picture tube guns.

The described signal processing apparatus constitutes a unique economical approach for signal processing in a color receiver. In operation, the composite color television signal is detected in picture detector 13 and delivered through cathode follower 20 to the signal processing apparatus. The luminance Y signal is available at resistor 32 as a first signal source. The chroma signal is separated from the luminance component by filter 37–41 and after amplification in chroma amplifier 60 is applied to the blue and red demodulators which, as explained, are floating in the grid circuits of matrix tubes 100*r* and 100*b*. Concurrently, gating pulses applied through transformer 90, gate burst amplifier 70 so that the pulses of color reference burst signal included within the composite color television signal are supplied from chroma amplifier 60 and burst amplifier 70 to the ringing circuit of crystal 75, periodically pulsing or driving the system. A Fourier analysis of the color bursts establishes that they constitute a steady carrier component of low amplitude pulse a series of side bands spaced in the frequency spectrum on opposite sides of the carrier and at multiples of the horizontal line rate. The crystal selectively rejects the side bands and in effect the crystal is continuously driven by a constant amplitude sine wave signal of fixed phase. As a consequence the crystal action remains at a predetermined phase with respect to the burst and its amplitude, which is determined by the burst amplitude of the received signal, is also essentially constant throughout line trace intervals. This signal is injected into the blue and red demodulators with substantially a 90° phase difference. Phasing of the injection signal relative to the chroma signal may be controlled by adjustment of the tuning slugs of the various coils to the end that the chroma signal is demodulated at the proper phase angles to detect the B–Y color-difference signal in the blue demodulator and the R–Y color-difference signal in the red demodulator. Since the demodulators are in series with Y signal source 32, the blue primary signal is applied to signal grid 101*b* of the matrix valve 101*b* whereas the red primary signal is applied to signal grid of 101*r* of matrix valve 100*r*. At the same time the Y signal alone is applied to signal grid 101*g* of matrix valve 100*g* and the matrixing which takes place at impedance 105 develops the green primary signal in the cathode circuit of the remaining valve 100*g*. This of course assumes that the signals applied to matrix are properly weighted and that switch 140, to be described hereafter, is closed, shunting resistor 141. The three amplified color primary signals are supplied from the matrix to cathode drive the three guns of the image repreducer as required to reproduce the translated image in simulated natural color.

It is appropriate here to comment further on the coupling considerations pertinent to the averaging demodulators. There is no conductive connection extending from either chroma amplifier 60 or from reference signal source 76 to the demodulators. Signal injection is by the inductive coupling previously described and stray capacitive coupling from the demodulators to these signal sources is minimized. Moreover, since the demodulators float with respect to Y signal source 32, their capacitance to ground is also minimized.

Stray coupling to the chroma and reference signal sources is to be avoided in order that there will be no unwanted signals applied to the signal grids of the matrix. Careful control of stray capacitance to ground is desired to the end that there is a negligible D.C. output from either demodulator in the presence of the reference signal alone. Where this condition is attained, correct color balance exists for the image reproducer on monochrome versus color reproduction. To achieve such a balance, coils 50, 50′ may have adjustable end turns of well known design.

Cathode follower 20 has a unique role in the color processing apparatus in addition to coupling the picture detector 13 to the luminance and chroma signal channels. More specifically, it prevents feedback of the chroma and reference signals through delay line 31, and resistors 30 and 35. This follows since the impedance looking in from the cathode of tube 20 is of the order of $1/g_m$, where $g_m$ is the transconductance of the tube and usually is a very low value of impedance in comparison with resistors 30 and 35.

Switch 140 is for set-up purposes. In normal operation of the receiver, the switch is closed to the position represented by drawing, but for set-up it is moved to its alternate position, engaging terminal V and adding resitor 141 into the common cathode circuit of the matrix. With switch 140 adjusted to the set-up position, the vertical sweep is grounded or disabled. With the vertical sweep disabled, the added cathode resistance approximates black level for normal picture signals and the individual grid potentimeters 120*g*, 120*r*, 120*b* are adjusted for low light color balance. Thereafter, switch 140 is closed and high light color balance is established by the potentimeters 104*g*, 104*r*, 104*b* in the anode circuits of the three valves of the matrix.

There are other adjustments available for optimizing receiver operation. The contrast control 24 has already been mentioned and it requires that the tubes 100 of the matrix be of the variable m$\mu$ type. It effects simultaneous and proportionally weighted changes in the intensity of both luminance and chrominance signals by adjusting the grid bias of cathode follower 20, and the operating point of the variable m$\mu$ tubes.

There are a variety of methods for hue adjustment, including the use of a tuning slug in the inductor 50, for example, of the blue demodulator. Since the phase relation of the two injection signals of the blue and red demodulators is a consequence of coupled resonant circuits, phase adjustment of the demodulator signal for the blue demodulator is automatically reflected into the red demodulator. One may of course have a variable capacitor or core to tune circuit 76 for hue control or it is convenient to have an adjustable RC network included in the anode circuit of burst amplifier 70 with an adjustment accessible at the control panel of the receiver for hue control.

The potentiometer 85 which determines the amplitude delay bias of ACC diode 80 also affords a color level control.

One operative embodiment of the described arrangement included the following:

Resistors:

| | | |
|---|---|---|
| **18, 35** | ohms | 3900 |
| **19** | | 12K |
| **22** | megohms | .82 |
| **23** | do | .5 |
| **24** | do | 10 |
| **25, 120** | do | 1 |
| **30** | ohms | 1200 |
| **32** | do | 1500 |
| **55, 55′, 56, 56′** | | 3.3K |
| **62** | | 39K |
| **63** | megohms | 2.2 |
| **64** | | 1K |
| **65** | | 5.6K |
| **83** | | 220K |
| **84** | | 680K |
| **85, 121** | | 100K |
| **87** | | 560K |
| **88** | megohm | 1 |
| **91** | ohms | 150 |
| **93, 114, 135** | | 22K |
| **96** | | 3.9K |
| **103** | | 6.8K |
| **104** | | 2K |
| **105** | ohms | 10 |
| **111, 126** | | 33K |
| **122** | | 470K |
| **131** | | 68K |
| **141** | ohms | 33 |
| **58** | do | 180 |
| **58′** | do | 120 |

Capacitors:

| | | |
|---|---|---|
| **16** | μμf | 56 |
| **21, 59, 71, 79, 82, 83, 112, 117** | microfarads | .01 |
| **36** | do | 9 |
| **39** | do | 4.5 |
| **41** | do | 6 |
| **66** | do | .047 |
| **81, 107, 107′** | μμf | 22 |
| **92, 94, 129** | microfarads | .022 |
| **125** | do | .001 |

Inductances:

| | | |
|---|---|---|
| **15** | microhenries | 22 |
| **17** | do | 1 |
| **37, 38** | do | 200 |
| **102** | do | 180 |
| **106, 106*a*** | do | 330 |
| **113** | do | 680 |

| | |
|---|---|
| Resonant circuits: | |
| **50–52, 50′, 51′, 76** | Tuned to 3.58 mc. |
| **77** | Tuned to 1.7 mc. |
| Cathode follower **20** | ½ 12AT7. |
| Chroma amplifier **60** | 6BZ6. |
| Burst amplifier **70** | 6JC6. |
| Matrix amplifiers **100** | 1/2 6AR11. |
| Picture tube **110** | 25GP22A. |
| Time delay network **31** | .7 microsecond delay. |
| Voltage levels blue vs. red demodulators | 1.4/1. |

Advantages of the described signal processing apparatus are manifest. The circuit is a distinct simplification compared with arrangements of the prior art. Full D.C. transmission is provided for the luminance signal as well as for the color control signals. And, most importantly, demodulation of the chroma signal occurs at exceedingly low signal level to develop color difference signals that add directly to the luminance to produce low level primary color signals. This drastically minimizes the drive requirements otherwise imposed on the chroma portion of the color receiver. The synchronous detectors are of the diode averaging type to overcome the signal-to-noise deficiencies of diode peak detectors with respect to a product detector. If the detectors are substantially balanced, as indicated above, there should be no requirement for the color killer circuitry found in many commercial receivers. This is because ringing of the high-Q reference source 76 and therefore injection into the color demodulators is negligible in the absence of a color burst signal in view of the time gating of amplifier 70 and the extreme frequency selectivity of the ringing circuit.

Should the protection of a color killer be desired, the arrangement of FIGURE 3 may be employed. In this arrangement a diode 150 is connected through the secondary winding of pulse transformer 149 and a resistor 151 to the tap of a potentiometer 152 in a voltage dividing network, the tap also having a by-pass capacitor 153. The diode is in the nature of a clamp in the connection from chroma amplifier 60 to burst amplifier 70. In the absence of a color signal, no burst is delivered to the circuit of crystal 75, and accordingly no ACC potential is developed by diode 80. As a consequence, chroma amplifier 60 functions with full gain and the cathode potential of diode 150 is rendered less positive than the anode. Under these circumstances, the diode conducts and completes a low impedance path to ground through resistor 151 and capacitor 153.

Therefore, no signals are applied from the chroma circuits to the demodulators. Horizontal retrace pulses are applied through transformer 149 to block diode 150 and interrupt the low impedance path during line retrace so that if a color program should be received, the burst pulses are transferred to gated amplifier 70. This permits the gain control voltage to be developed and to be applied to chroma amplifier 60, rendering the amplifier less conductive and causing the cathode of diode 150 to be positive relative to its anode. This blocks the diode so that the chroma section of the receiver operates as previously described during the reception of a color program.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A signal processing apparatus for a color television receiver comprising:

a video detection system for supplying a composite color television signal having a luminance signal representing brightness information of an image and further having a chroma signal including modulation components representing color information of said image;

a first signal source having an input circuit coupled to said detection system and having a load impedance for deriving therefrom said luminance signal;

a second signal source having an input circuit coupled to said detection system independently of said first source for deriving therefrom said chroma signal substantially free of said luminance signal;

said second source including a demodulator having a load impedance for developing from said chroma signal a color difference signal; and said load impedances of said first and second sources being connected in series to combine said luminance and said color-difference signals to develop a primary color signal.

2. A signal processing apparatus in accordance with claim 1 including an amplifier for said primary color signal having a signal input grid, and in which said demodulator is connected between said first signal source and said grid and floats with respect to said first signal source.

3. A signal processing apparatus in accordance with claim 2 in which said input circuit of said second signal source comprises an amplifier tuned to said chroma signal, having input electrodes connected to said detection system, and having an output circuit inductively coupled to said demodulator for applying said chroma signal thereto.

4. A signal processing apparatus in accordance with claim 3 including a gated burst amplifier having a high Q output circuit likewise tuned to said chroma signal and having an input circuit coupled to said output circuit of said chroma amplifier to be driven therefrom during time spaced gating intervals to develop a reference signal by ringing in said high Q circuit, said high Q circuit having inductive coupling to said demodulator for injection of said reference signal.

5. A signal processing apparatus in accordance with claim 4 including an automatic chroma control circuit having an input coupled to the output of said gated burst amplifier, having a load circuit for developing a control potential which varies with amplitude variations of said chroma signal, and having a connection with said input of said chroma amplifier for applying said control potential thereto to control the gain of said chroma amplifier and maintain approximately constant amplitude of the chroma and reference signals applied to said demodulator.

6. A signal processing apparatus in accordance with claim 1 comprising a third signal source coupled to said detection system and including a demodulator having a load impedance similarly connected in series with said load impedance of said first source for developing a second color difference signal to combine with said luminance signal and develop a second primary color signal, and further comprising a matrix coupled to all three of said signal sources for developing a third primary color signal.

7. A signal processing apparatus in accordance with claim 6 in which said matrix includes three amplifying valves having individual control electrodes and output load impedances but sharing a common emitter impedance;

and in which the control electrode of one of said valves is connected to said first signal source while the control electrodes of the remaining two valves are connected to the load impedances of said second and third sources, respectively, to develop three amplified primary color signals in the output load impedances of said amplifiers.

8. A signal processing apparatus in accordance with claim 7 which includes a color image reproducing device driven by said three primary color signals and in which said three valves provide the principal amplification of the signals delivered by said detection system.

9. A signal processing apparatus in accordance with claim 1 comprising a third signal source including a demodulator having a load impedance for developing another color-difference signal, in which the connection of said third source with said detection system and with said first source are the same as the corresponding connections of said second signal source, and further in which a primary circuit resonant at a frequency corresponding to the fundamental component of said chroma signal is coupled to a pair of similar resonant circuits which are included in said demodulators, respectively, and which have parameters related to one another to exhibit a constant bandwidth but unequal secondary chroma signal levels to weight said color-difference signals in a predetermined amount.

10. A signal processing apparatus in accordance with claim 5 in which said chroma control circuit includes a rectifier for rectifying said reference signal to develop said control potential, and further includes an amplitude delay bias network for applying an amplitude delay bias to said rectifier to control the color level in said apparatus.

References Cited

UNITED STATES PATENTS 3,020,338 2/1962 Rhodes ............ 178—5.4

RICHARD MURRAY, Primary Examiner

J. MARTIN, Assistant Examiner